(12) United States Patent
Crom et al.

(10) Patent No.: US 8,239,586 B2
(45) Date of Patent: Aug. 7, 2012

(54) METHOD AND APPARATUS FOR INTERFACING WITH MULTIPLE OBJECTS USING AN OBJECT INDEPENDENT INTERFACE PROTOCOL

(75) Inventors: Elden Crom, Tucson, AZ (US); David Crowe, Tucson, AZ (US); Paul Kenjora, Phoenix, AZ (US); Sean Mulholland, Tucson, AZ (US)

(73) Assignee: Tucson Embedded Systems, Inc., Tucson, AZ (US)

( * ) Notice: Subject to any disclaimer, the term of this patent is extended or adjusted under 35 U.S.C. 154(b) by 406 days.

(21) Appl. No.: 12/434,488

(22) Filed: May 1, 2009

(65) Prior Publication Data

US 2010/0077108 A1 Mar. 25, 2010

Related U.S. Application Data

(60) Provisional application No. 61/049,499, filed on May 1, 2008.

(51) Int. Cl.
*G06F 3/00* (2006.01)
*G06F 5/00* (2006.01)

(52) U.S. Cl. .............................. 710/11; 710/36
(58) Field of Classification Search .................. 710/11, 710/36
See application file for complete search history.

(56) References Cited

U.S. PATENT DOCUMENTS

2003/0233637 A1* 12/2003 Martin ............................ 717/134
2008/0155513 A1* 6/2008 Ling et al. ....................... 717/135
* cited by examiner

*Primary Examiner* — Chun-Kuan Lee
*Assistant Examiner* — Zachary K Huson
(74) *Attorney, Agent, or Firm* — Nikia L. Gray; Quarles & Brady, LLP

(57) ABSTRACT

A method and apparatus is presented for using multiple device specific interface protocols for communicating with a platform, where each of the devices comprises a set of parameters. For each parameter of each set of parameters a function call is established to set the parameter for each of the devices that enable the parameter. Using each function call, the plurality of object specific interface protocols is then transformed into a non-device specific interface protocol for communication with the platform.

30 Claims, 5 Drawing Sheets

METHOD AND APPARATUS FOR INTERFACING WITH MULTIPLE OBJECTS USING AN OBJECT INDEPENDENT INTERFACE PROTOCOL

RELATED APPLICATION

This patent application claims priority to prior provisional Application No. 61/049,499 filed May 1, 2008, entitled Implementation Specific Devices Interfaced By System and Device Independent Software, which is hereby incorporated herein by reference.

FIELD

The present invention relates generally to software and hardware integration, and more particularly to the integration of independent software and hardware products in safety-critical, mission critical, or other regulated applications.

BACKGROUND

The development of highly complex systems typically involves the use of multiple specialized vendors to design and manufacture specific, stand-alone components that are then integrated into the system. Unless an industry standard has been adopted, each stand-alone component is often developed using a proprietary and/or unique interface protocol. To integrate such components, customized interfaces must be developed, tested, and in certain applications, certified. The complexity of the integration effort is further increased where the same component needs to be integrated with multiple disparate platforms.

The complexity of integrating components into sophisticated systems can lead to the development of ad hoc architectures. Popularly called "stovepipes," such systems use point-to-point integration and can lack coordination and planning across multiple systems. Thus, prior integration efforts are often duplicated and the resulting system can suffer with a costly, unmaintainable, and unextendable architecture.

The impact of such systems is perhaps most strongly felt in areas of safety-critical or mission-critical development, such as avionics, defense, and medical, as well as applications requiring high reliability, determinism, robustness or continuous availability. The need to satisfy strict industry testing and certification regulations can turn the process of replacing or upgrading a mundane component into a substantial implementation-specific development effort, resulting in additional costs and time delays.

FIG. 1 depicts an example of the prior art process 100 of integrating components into complex systems, such as aircraft, ships, motorized vehicles, and even robots. Although FIG. 1 is described in terms of integrating physical peripherals, a person of ordinary skill in the art will understand that the discussion is equally applicable to the integration of software. In the illustrated embodiment of FIG. 1, objects 108, 110, and 112 are depicted having capabilities which make it desirable that objects 108, 110, and 112 are interchangeable with systems 102, 104, and 106. Objects 108, 110, and 112 may be, by way of example and not limitation, a group of radios, radars, sensors, actuators, or other devices or software. Systems 102, 104, and 106 are depicted as aircraft having unique and differing implementations.

Generally speaking, an implementation is the successful actualization of a technical specification or algorithm as a program, software component, or other computer system. Various implementations may exist for a given specification or industry standard, many being unique and proprietary in nature. The framework allowing a given software application, including the control code of a physical periphery, to run is specifically described by a platform, which often includes a combination of the operating system (OS), programming languages and related runtime libraries, and user interfaces. The relationship between hardware components comprising a system and their individual properties is similarly described by the system's hardware and software architectures and focuses on managing and controlling dependencies. Thus, the integration of an object, either physical or virtual, having control code designed for one implementation into a system designed for another implementation involves the use of an interface having an architecture capable of managing the interactions between the object and system as well ensuring proper interpretation of commands.

Thus, for example, the integration of object 108 into systems 102, 104, and 106, can require the development of three separate interfaces, one for each system. Because the driving force of each integration effort is the characteristics of the given system, the architecture of each resulting interface can be fragile and limited in terms of reusability or adaptability. Therefore, although objects 110 and 112 are similar in terms of function, little of the development effort that went into creating the interfaces for object 108 can be reused or modified in integrating objects 110 and 112 with systems 102, 104, and 106. The ultimate result is the undertaking of nine (9) duplicative, costly and time consuming, implementation-specific design efforts (illustrated by the connecting lines in FIG. 1) to integrate each object with each system. Where the systems are for use in safety-critical, mission-critical, or other regulated applications, each object-system implementation may further require verification and certification before release, with the extensive testing required further increasing costs and time delays.

Therefore, there is a need to develop an architecture allowing non-system and non-component specific integration of elements, where the architecture is verifiable, certifiable, and reusable within a given industry.

SUMMARY

In one implementation, a method is presented for using multiple device specific interface protocols for communicating with a platform, where each of the devices comprises a set of parameters. For each parameter of each set of parameters a function call is established to set the parameter for each of the devices that enable the parameter. Using each function call, the plurality of object specific interface protocols is then transformed into a non-device specific interface protocol for communication with the platform.

In another implementation, an article of manufacture is presented. The article of manufacture comprises a computer readable medium comprising computer readable program code disposed therein for using multiple device specific interface protocols for communicating with a platform, where each of the devices comprises a set of parameters. The computer readable program code comprises a series of computer readable program steps to effect establishing, for each parameter of each set of parameters, a function call to set the parameter for each of the devices that enable the parameter and, using each function call, to transform the plurality of object specific interface protocols into a non-device specific interface protocol for communication with the platform.

In yet another implementation, a computer program product is presented. The computer program product is encoded in a computer readable medium and is usable with a programmable computer processor for using multiple device specific interface protocols for communicating with a platform, where each of the devices comprises a set of parameters. The computer program product comprises computer readable program code which causes the programmable processor to establish, for each parameter of each set of parameters, a function call to set the parameter for each of the devices that enable the parameter and, using each function call, to transform the plurality of object specific interface protocols into a non-device specific interface protocol for communication with the platform.

BRIEF DESCRIPTION OF THE DRAWINGS

Embodiments of the invention will become more apparent from the detailed description set forth below when taken in conjunction with the drawings, in which like elements bear like reference numerals.

DETAILED DESCRIPTION

The present discussion considers the ability to replace or exchange components in complex systems. Further, the present discussion considers the ability to replace or exchange such components in complex systems requiring significant testing or other means of approval before implementation. By way of example and not limitation, such applications include safety-critical, mission-critical, deterministic, high-reliability, robust, and continuous availability systems. Applicants' specifically disclose a method and apparatus for creating an interface architecture that is both non-implementation specific, i.e., system and component agnostic, and verifiable, certifiable, and reusable.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
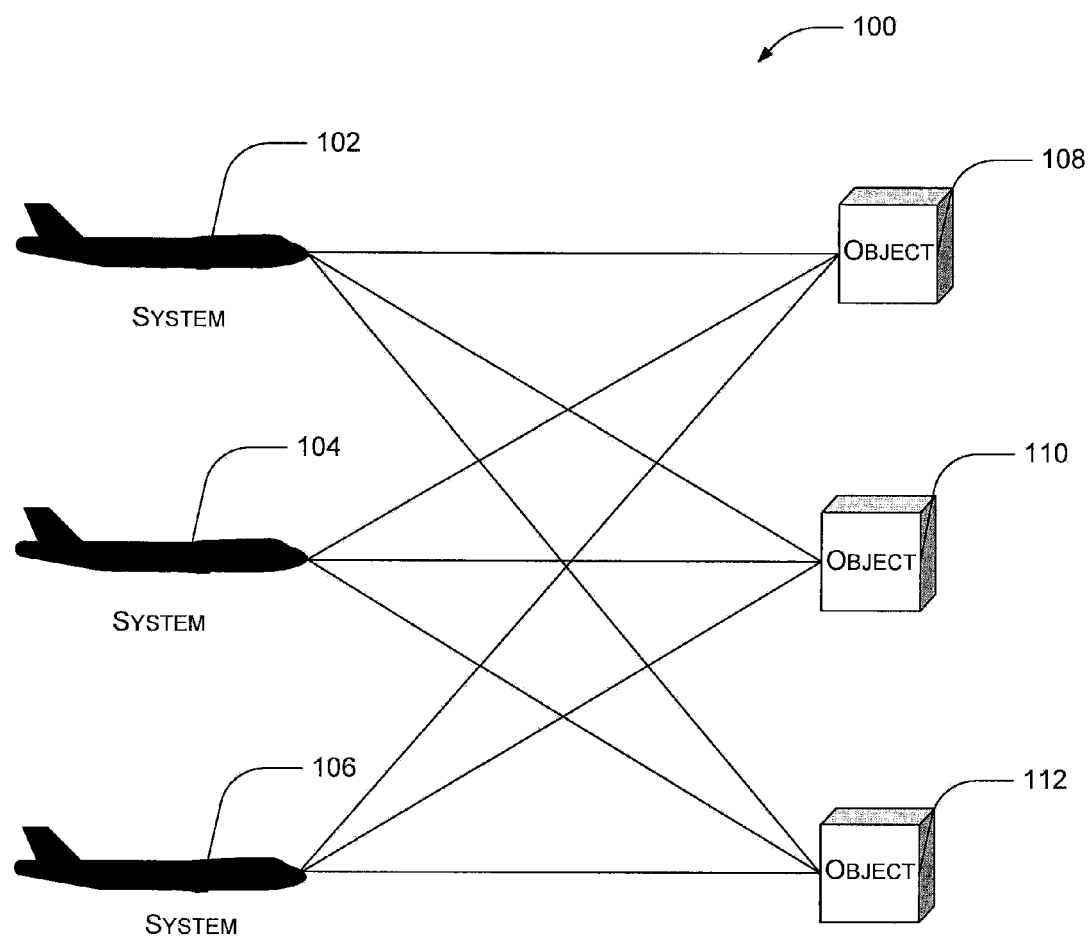
FIG. 1 illustrates an example of the prior art method of integrating components with implementation-specific systems.
Figure 2:
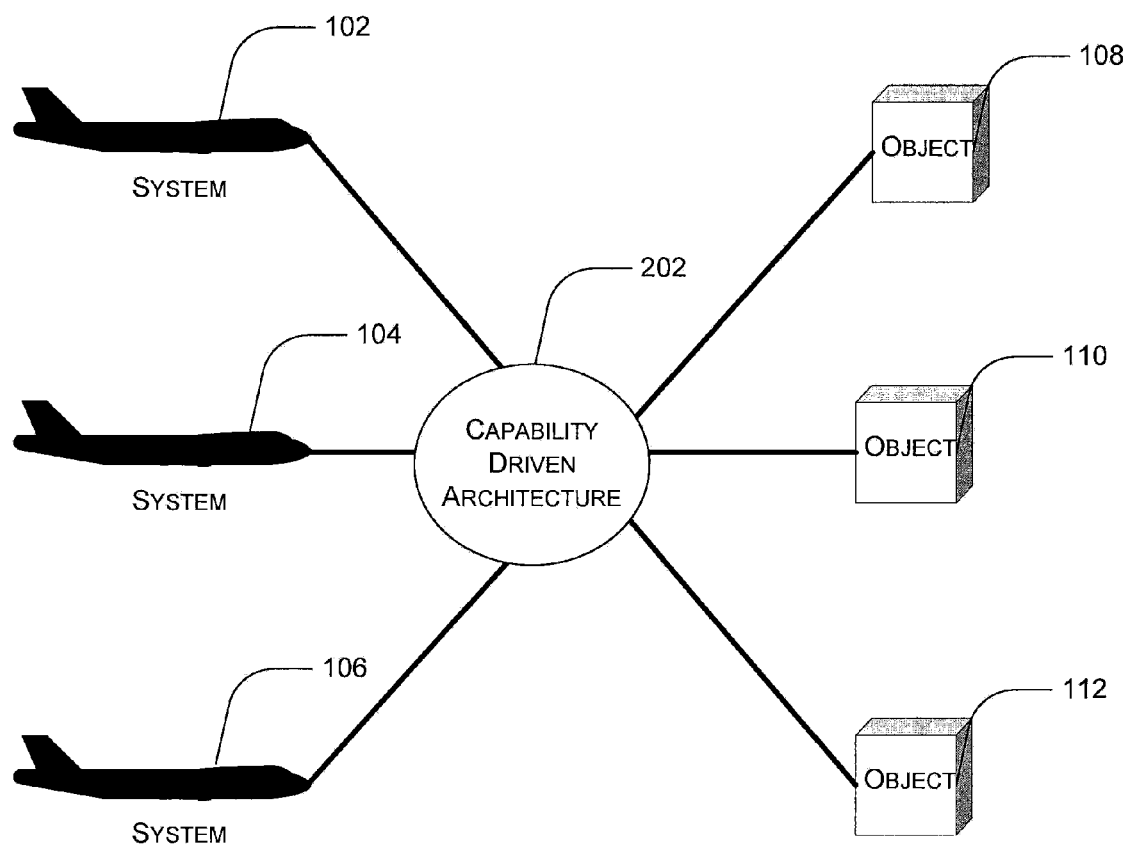
FIG. 2 illustrates an example of the integration components using the disclosed invention.

Turning now to FIG. 2, an exemplary illustration of the integration of multiple objects into complex systems using Applicants' invention is presented. As described in regards to FIG. 1, objects 108, 110, 112 and systems 102, 104, and 106 are designed for different implementations. Applicants' invention involves generating an interface 202 which is both implementation independent and usable with each object-system combination. Thus, the effort required to integrate and maintain each implementation and undergo any industry-specific certification or verification process is significantly reduced. Each object-system combination can utilize interface 202 with little to no additional development effort, facilitating the ease at which components can be changed. Furthermore, interface 202 itself may be verified and certified under an industry standard, minimizing or eliminating the need to undergo extensive and costly test development for each object-system combination through the reuse of certification artifacts. Applicants' process of generating interface 202 is subsequently discussed in greater detail.

As will be clear to one of ordinary skill in the art, by the term "object" Applicants refer to hardware, firmware, and software based components, or combinations thereof. Furthermore, in certain embodiments, the integration of software includes the integration of different operating systems (OSs) and input/output (I/O) routines.

Figure 5:
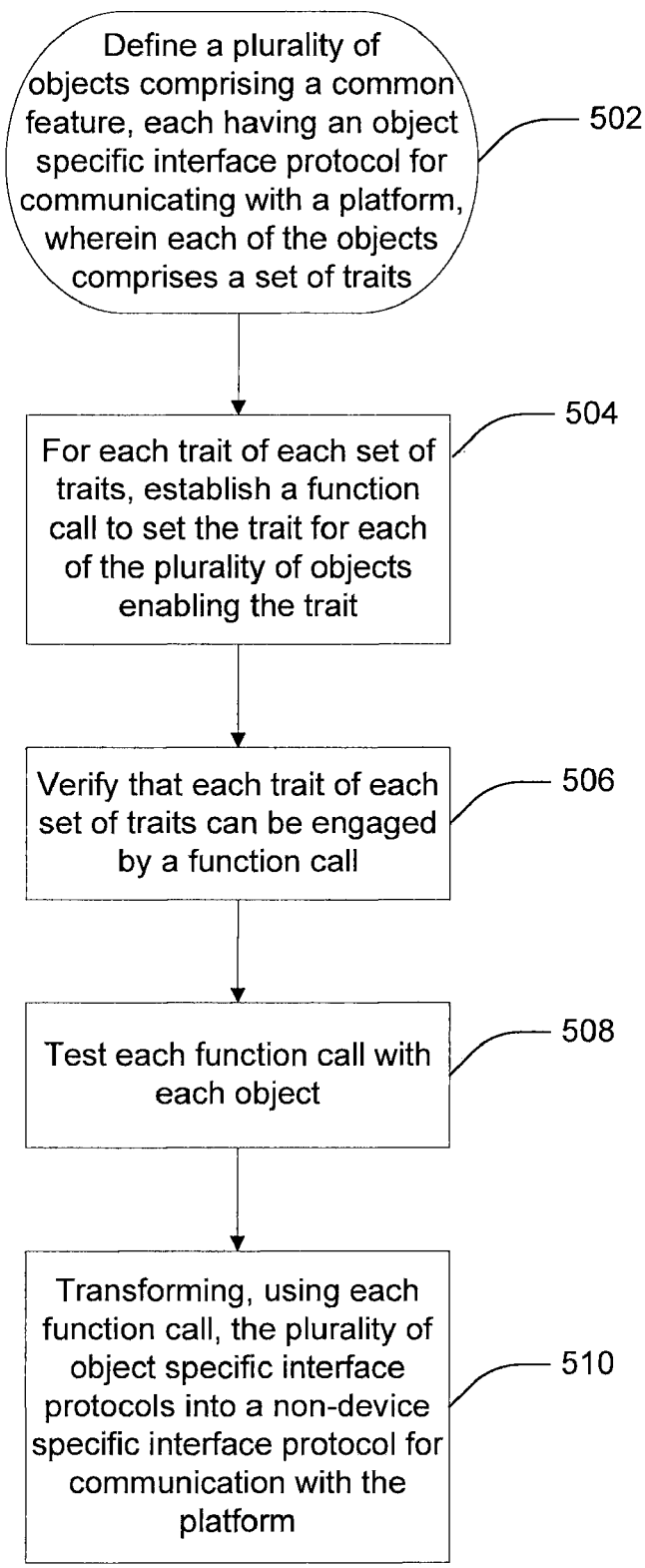
FIG. 5 illustrates a flowchart of an exemplary embodiment of Applicants' invention.

Turning now to FIG. 5, a flowchart is presented depicting an exemplary embodiment of Applicants' invention. As indicated by block 502, a group of objects is defined for interfacing with the platform of a system, where each of the objects have a unique object specific interface protocol and set of traits. As used herein, a "trait" is a functionality, ability, characteristic, behavior, or other similar feature of an object, or combination thereof with which it is desirable for the system to engage via the present invention. In certain embodiments, a set of traits comprises all of the traits for a given object that can be engaged. In certain embodiments, a set of traits comprises a subset of all of the traits that can be engaged. In such embodiments, it may be desirable to prevent the system from engaging one or more traits of the object and therefore such traits are not included in the set of traits.

In certain embodiments, the group of objects is defined by the need to exchange the objects in and out of a particular system or class of systems. In certain embodiments, the group of objects is defined by the general function of the devices. In other embodiments, the group of objects may be defined by specifications provided by a manufacturer, end-user, or other entity. In certain embodiments, the group of objects is defined by a particular use of a system or group of systems.

In the illustrated embodiment of FIG. 5, for each trait of each set of traits, a function call is established, wherein the function call can set the trait for each of the objects enabling the trait, as indicated by block 504. In certain embodiments, establishing a function call includes modifying a previously established function call to set additional parameters. In such an embodiment, an established function call may set more than one parameter. In certain embodiments, establishing the function calls includes defining the control functions of each object. In such embodiments, identification of the control functions includes analyzing interface control documentation (ICD) for each object. Further, in such embodiments, each object may be manufactured by a different vendor, where the ICD for a given object is provided by the vendor. In certain embodiments, establishing the function calls includes defining the requirements and parameters of object-specific control functions. In certain embodiments, establishing the function calls includes abstracting object-specific control functions by mapping the data fields of different communication protocol to function parameters. In such an embodiment, the communication protocol may be for serial data buses, Ethernet, wireless, or any other interface, or combination thereof. In certain embodiments, the identification and abstraction of object-specific control code is automated. In certain embodiments, the establishment of function calls is automated.

Figure 3:
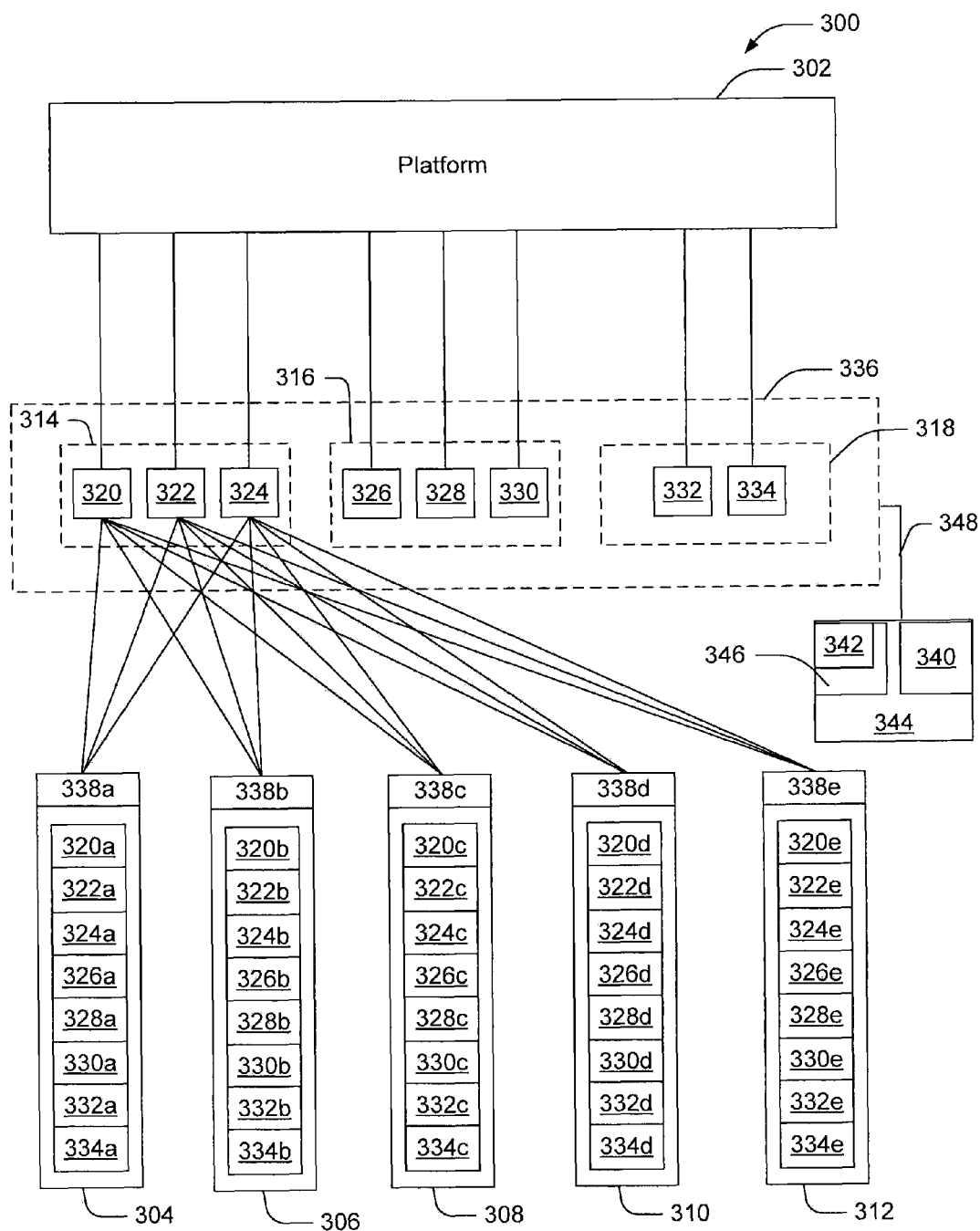
FIG. 3 illustrates a block diagram of an exemplary embodiment of an architecture for interfacing multiple objects having similar uses with a given system according to Applicants' invention.

Turning now to FIG. 3, a block diagram is presented depicting an exemplary embodiment of an architecture 300 for integrating a defined group of objects with a given system. As depicted in the illustrated embodiment of FIG. 3, objects 304, 306, 308, 310, and 312 are depicted having traits 320a-334e. Furthermore, objects 304, 306, 308, 310, and 312 each have a proprietary and/or unique interface, 338a-e.

In the illustrated embodiment of FIG. 3, to aid in establishing the function calls, the traits have been sorted to capabilities, where each capability includes one or more related traits enabled by one or more of the objects. As will be understood by one of ordinary skill in the art, the process of sorting related traits into capabilities facilitates the identification of overlaps and similarities in the object-specific control code. In certain embodiments, capabilities are not needed or defined.

In the illustrated embodiment of FIG. 3, capabilities 314, 316, and 318 are depicted. Capability 314 includes traits 320a-e, 322a-e, and 324a-e, capability 316 includes traits 326a-e, 328a-e, and 330a-e, and capability 318 includes 332a-e and 334a-e. By way of example and not limitation, objects 304, 306, 308, 310, and 312 may be different navigation devices, sensors, communication devices or any other type of hardware or software component of a complex system. If by way of example objects 304, 306, 308, 310, and 312 are navigation devices, such as radios, traits 320a-330e may be, by way of example and not limitation, set power, set frequency, set volume, get frequency, set squelch, and get squelch, respectively. Thus, capability 314 may be defined to include those traits related to general radio functions, such as set power, set frequency, and get frequency, even though each of those traits are engaged in a unique and/or proprietary manner for each radio. Likewise, capability 316 may be defined to include those traits related to voice functionality, such as set volume, set squelch, and get squelch.

As stated, organizing the traits into groupings based on the function of the trait facilitates establishing function calls. In the illustrated embodiment of FIG. 3, function calls 320, 322, and 324 are established for the traits defining capability 314 (i.e., 320a-e, 322a-e, and 324a-e). Thus, function call 320, of capability 314, is capable of engaging trait 320a of object 304, 320b of object 306, 320c of object 308, 320d of object 310, and 320e of object 312. Likewise, function call 322, is capable of engaging trait 322a of object 304, 322b of object 306, 322c of object 308, 322d of object 310, and 322e of object 312 and function call 324, is capable of engaging trait 324a of object 304, 324b of object 306, 324c of object 308, 324d of object 310, and 324e of object 312. As will be understood by one of ordinary skill in the art, lines indicating function calls 326, 328, 330, 332, and 334 are capable of engaging the respective traits of objects 304, 306, 308, 310, and 312 have been omitted for clarity.

In certain embodiments, one or more function calls are the same as the object-specific control function for a given trait of a given object. In certain embodiments, one or more objects within the group of objects does not have one or more of the traits for which a function call is established.

In the illustrated embodiment of FIG. 3, function calls 320, 322, 324, 326, 328, 330, 332, and 334 are referred collectively as abstraction layer 336. Thus, platform 302 of a system communicates with abstraction layer 336 to implement a trait regardless of the specific object being controlled. By way of example and not limitation, for platform 302 to engage trait 326b of object 306, platform 302 uses function call 326, where function call 326 is capable of communicating with the object specific code of object 306. Likewise, to engage trait 326d of object 310, function call 326 is also used and is capable of communicating with the object specific code of object 310.

In certain embodiments, abstraction layer 336 is implemented using host computer 344. In certain embodiments, host computer 344 comprises one or more mainframe computers, one or more work stations, one or more personal computers, combinations thereof, and the like. In certain embodiments, host computer 344 comprises processor 340 and computer readable medium 346. In certain embodiments, instructions 342 are encoded in computer readable medium 346.

In such embodiments, information is transferred between host computer 344, platform 302 and/or objects 304, 306, 308, 310, and 312, via communication links, such as communication link 348. The communication links comprise an interconnection, such as an RS-232 cable or an RS-422 cable, an Ethernet interconnection, a SCSI interconnection, a Fibre Channel interconnection, an ESCON interconnection, a FICON interconnection, a Local Area Network (LAN), a private Wide Area Network (WAN), a public WAN, Storage Area Network (SAN), Transmission Control Protocol/Internet Protocol (TCP/IP), the Internet, combinations thereof, and the like.

As will be clear to one of ordinary skill in the art, by integrating the capabilities of the defined group of objects, via generalized function calls, rather the individual objects themselves, the resulting interface is independent of the specific object-system implementation. Thus, by way of example and not limitation, using such a capability driven interface according to the present discussion to integrate a complex system, such as a ship, with a group of functionally-similar objects, such as navigation devices, enables the replacement and/or exchange of the objects without further integration efforts. Wherein, by way of example and not limitation, the group of objects includes navigation device A and navigation device B, having been designed for implementation A and implementation B, respectively, to get the speed of a ship using navigation device A, the system accesses the function call for the "get speed" trait. When navigation device A is replaced with navigation device B, the system accesses the same function call; the use of the capability driven architecture thereby removing the need to develop specific object-system interfaces.

In the illustrated embodiment of FIG. 5, the mapping of each trait to one of the function calls is then verified, as indicated by block 506. In certain embodiments, verification includes reviewing functional relationships and commonalities and identifying gaps and overlaps of the mapped function parameters. In certain embodiments, verification includes redefining capabilities. In certain embodiments, verification includes clarifying function calls. In certain embodiments, verification includes simplifying function calls. In certain embodiments, verification includes repeating the process indicated by block 504.

Next, as indicated by block 508, each function call is tested with each object, wherein the testing ensures that each function call can engage the appropriate trait of each object. In certain embodiments, such testing involves, where a function call fails to engage a trait of an object, repeating the processes indicated by blocks 504, and/or 506. In certain embodiments, the process of creating the function calls generates a test script. In such embodiments, the test script may be reusable with each object of the defined group of objects. In other such embodiments, the test script may be reusable when a new object is added to the defined group of objects. In certain embodiments, the test script conforms to industry-compliant software coding standards. In certain embodiments, the process of creating the function call generates documentation describing the requirements of the function calls. In such embodiments, the generated documentation may describe the scaling, values, format, or any other detail of the variables used by the function calls.

In the illustrated embodiment of FIG. 5, as indicated by block 510, the plurality of object specific interface protocols are then transformed, using the established function calls, into a non-object specific interface protocol for communication with the system. In certain embodiments, the object specific interface protocols are transformed into a non-object specific interface protocol by compiling the object code to create an executable. In certain embodiments, the object specific interface protocols are transformed into a non-object specific interface protocol by isolating the system from the objects via the function calls.

Figure 4:
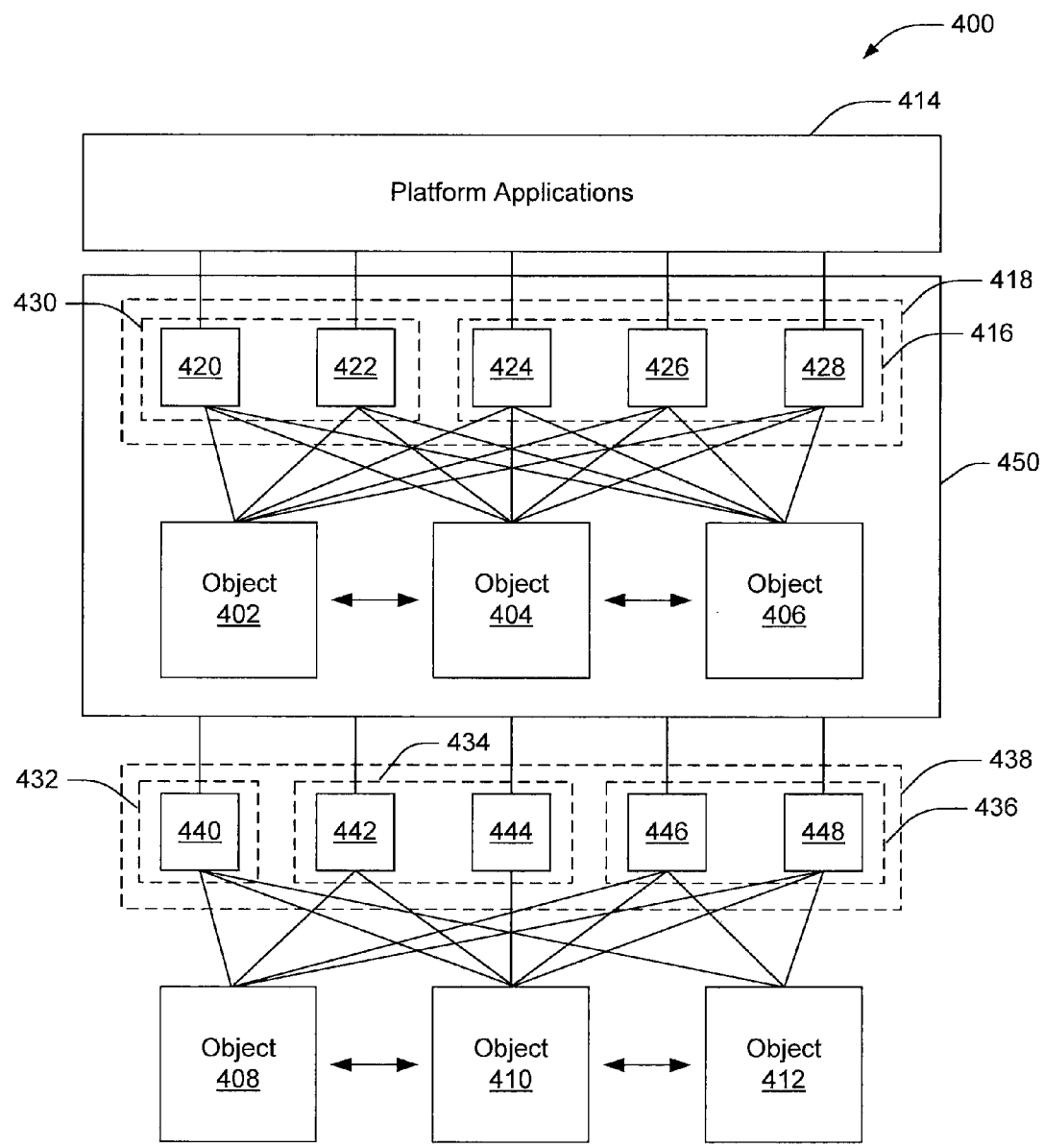
FIG. 4 illustrates a block diagram of an exemplary embodiment of a capability driven architecture according to Applicants' invention.

Turning to FIG. 4, a block diagram is presented depicting an exemplary embodiment of a capability driven architecture 400 according to Applicants' invention, wherein a plurality of object specific interface protocols for objects 402, 404, 406 408, 410, and 412 is transformed into a single generalized interface protocol.

In the illustrated embodiment of FIG. 4, objects 402, 404, and 406 may be different hardware components, such as by way of example and not limitation, radios, while objects 408, 410, and 412 are various system specific operating systems and system hardware combinations with which objects 402, 404, and 406 may be integrated. In the illustrative embodiment of FIG. 4, at the highest level is application layer 414.

Below application layer 414 is abstraction layer 418. Broadly speaking, abstraction layer 418 provides the interface between application layer 414 and the object-specific function calls of objects 402, 404, and 406. Abstraction layer 418 is depicted as including capabilities 430 and 416 having function calls 420, 422, 424, 426, and 428. The function calls 420, 422, 424, 426, and 428 are capable of communicating with the object specific function calls of objects 402, 404, and 406 to engage associated traits. As one, abstraction layer 418, capabilities 430 and 416, function calls 420, 422, 424, 426, and 428, and integrated object 402, 404, or 406 may be considered the object capability driven architecture 450 of architecture 400, wherein object capability driven architecture 450 is device independent. Thus, object capability driven architecture 450 can be used to integrate any group of defined objects, here objects 402, 404, and 406, with a given system.

To integrate objects 402, 404, and 406, with multiple systems having different operating environments, a second abstraction layer is used to isolate object capability driven architecture 450. In certain embodiments, the multiple systems comprise different types of systems within a given category of systems. By way of example and not limitation the different systems may all be aircraft and may include a helicopter, an airplane, and an unmanned aircraft. Alternatively, the different systems may all be ships and may include a cargo vessel, a submarine, and an aircraft carrier. In certain embodiments, the multiple systems comprise unrelated systems having the need to integrate the same defined group of objects. In such an embodiment the group of objects may be radios and the multiple systems may include a military jet, an aircraft carrier, and a High-Mobility Multipurpose Wheeled Vehicle (HMMVW). Alternatively, the group of objects may be navigation devices and the multiple systems may be an unmanned ground vehicle, an oil tanker, and an underwater research robot.

To create the second abstraction layer, here illustrated as abstraction layer 438, having capabilities 432, 434, and 436, and function calls 440, 442, 444, 446, and 448, the exemplary process illustrated in FIG. 5 is repeated, wherein objects 408, 410, and 412 are the system specific operating systems and system hardware combinations. In such an embodiment, capabilities 432, 434, and 436 may correspond to a single operating system service or related set of operating system services.

In certain embodiments, the exemplary process illustrated in FIG. 5 is iterative. In certain embodiments, certain combination of processes illustrated in FIG. 5 are iterative. In certain embodiments, individual processes described in connection with FIG. 5 may be combined, eliminated, or reordered.

In certain embodiments, instructions, such as instructions 342 (FIG. 3) are encoded in computer readable medium, such as computer readable medium 346 (FIG. 3) wherein those instructions are executed by a processor, such as processor 340 (FIG. 3) to perform one or more of the blocks 502, 504, 506, 508, and/or 510, recited in FIG. 5.

In yet other embodiments, the invention includes instructions residing in any other computer program product, where those instructions are executed by a computer external to, or internal to, a computing device to perform one or more of the blocks 502, 504, 506, 508, and/or 510 recited in FIG. 5. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, CompactFlash, SmartMedia, and the like.

The following example is presented to further illustrate to persons skilled in the art how to make and use the invention. This example is not intended as a limitation, however, upon the scope of the invention, which is defined only by the appended claims.

EXAMPLE I

By way of example and not limitation, it may be desirable to exchange one radio with another in an aircraft without developing separate radio-specific control interfaces. Specifically, it may be determined that three military radios, RADIO A produced by Company A, RADIO B produced by Company B, and RADIO C produced by Company C, need to be interchangeable with one another without having to alter the interface between the currently installed radio and the aircraft.

Once the group of radios to be integrated is defined, the ICDs for the radios are examined. While it is not necessary for all the ICDs for each radio in the group be used, it will be understood by one of ordinary skill in the art, that the more ICDs that are analyzed, the more assurance that the resulting interface will be broad enough to communicate with each of the radios in the group. Furthermore, it will be understood by one of ordinary skill in the art that additional ICDs, for radios not currently being integrated, can also be analyzed to increase the breadth of the resulting interface. Thus, the use of additional ICDs decreases, or even eliminates, the need for additional development and/or testing if an new radio is added to the defined group of radios, here RADIO A, RADIO B, and RADIO C.

The ICDs are analyzed to determine what functionalities are common between the radios. By way of example and not limitation, all three military radios are able to act as normal, line-of-site radios without frequency hopping or encryption. Furthermore, RADIO B and RADIO C are capable of satellite communication (SATCOM). The related functions of the radios would be grouped into capabilities for ease and to facilitate further analysis. In the present example, the functions to set the transmitting frequency, set the receiving frequency, and to receive the transmitting frequency on all three radios may be assigned to the capability "Radio." Similarly, the function to set the satellite channel for RADIO B and RADIO C may be assigned to the capability "SATCOM."

While the radios used in the present example have more functions, which can be organized into more capabilities, than what is presently described, a person of ordinary skill will understand that for clarity only the four functions mentioned within the Radio and SATCOM capabilities will be described in the following example. However, a person of ordinary skill in the art will further understand the application of the present discussion to the complete range of functions of each radio.

Taking the Radio capability first, the parameters for setting the transmitting frequency, setting the receiving frequency, and receiving the transmitting frequency are determined, as well as the size and scaling of each parameter. In the present example, RADIO A can transmit and receive frequencies between 25 MHz to 425.325 MHz and can be set in 25 kHz increments and RADIO B can transmit and receive frequencies between 25 MHz to 150.695 MHz in 5 kHz increments. RADIO C can transmit and receive frequencies between 25 MHz to 150.695 MHz in 5 kHz increments, between 175 MHZ to 210.375 MHz in 25 kHz increments, and between 215 MHz to 425.325 MHz in 5 kHz increments.

In analyzing these parameters, it may be determined that a variable type of an unsigned integer of 32 bits (uint32) at 1 Hz per unit will be able to produce the full range of frequencies possible on each of the three radios. As will be known to one of ordinary skill in the art, uint32 allows values between 1 and 4,294,967,296. Thus, by setting each unit to 1 Hz, the variables of uint32 can represent any value between 1 Hz and 4.294967296 GHz.

A person of ordinary skill in the art will understand that other variable types and values may be used in the present example. By way of example and not limitation, each unit could equal 5 kHz, as 5 kHz Is the smallest increment of any of the three radios over their full range of frequencies. However, it would be understood that while 5 kHz can be used for the value of each unit, this may not be optimal for future integration of additional radios, which may have 1 kHz increments. Furthermore, by using the uint32 variable at 1 Hz per unit, the resulting interface will have the ability to represent a value roughly ten times larger than the highest frequency of any of the three radios. In looking forward to what additional radios may be integrated in the future, this value appears to be sufficiently large. Finally, by using 1 Hz per unit, rather then for example 5 kHz, the resulting function call will be simplified as no additional multiplication will be needed to determine the value to set the variable to.

Where using 1 Hz per unit results in the variable not being equal to an acceptable setting for a radio, given the radio's incremental settings, the ensuing function call may be created such that the variable is rounded to the closest acceptable value. Therefore, if, for example, the aircraft attempts to set the transmission frequency of RADIO B, to 32.787 MHz, a 2,787 kHz increase if RADIO B was originally at 30 MHz, the value is rounded to 32.785 MHz, the closest value RADIO B is capable of, when the generalized function call engages the object specific function calls for RADIO B.

Additionally, to establish a generalized function call, the device specific message format for each radio must be understood. In RADIO A the numeric value of the frequency is encoded in the first 16 bits of the first word of a message, wherein a word is represented by 4 bytes (32 bits). Specifically, the value is represented in megahertz by Binary Coded Decimal (BCD) and therefore each digit of the value is represented by a binary sequence. Of the first word, bits 0-3 represent tens, bits 4-7 represent ones, bits 8-13 represent tenths, and bits 12-15 represent hundreds. Additionally, RADIO A allows an offset to the encoded frequency, represented by bits 0 and 4-6 of the second word of the message, where bit 0 represents whether the offset is added or subtracted from the encoded frequency.

Similar to RADIO A, with RADIO B the value of the frequency, in megahertz, is represented in BCD. However, with RADIO B, it is the second word that represents the frequency. Specifically, of the second word, bits 0-3 represent tens, bits 4-7 represent ones, bits 8-13 represent tenths, and bits 12-15 represent hundreds. Also, RADIO B allows an offset to the encoded frequency, represented by bits 10-15 of the first word of the message, where bit 10 represents whether the offset is added or subtracted from the encoded frequency.

Finally, for RADIO C, the first word is used for the transmitting frequency while the second word is used for the receiving frequency. The value of the frequency, in megahertz, is multiplied by 1000 and converted to a 32 bit number.

Turning to the SATCOM capability, the industry-adopted SATCOM standard allows for, at most, 255 channels and defines the transmitting and receiving frequencies. Thus, the range of the SATCOM capability for RADIO B and RADIO C is the same, though, as with the Radio capability, the message format differs. For RADIO B, the satellite channel is set by the first word of a message. For RADIO C the satellite channel is set by bytes 1 and 2 of the third word.

Once the size, scaling, and or requirements of the parameters for each of the functions have been determined, the range of variation between the radios is known and function calls can be established. To set the transmitting frequency, a function call is written to accept a value for the frequency setting from the aircraft that handles all the variation between the devices by using a uint32 variable of 1 Hz per unit. This would be the same for the set receiving frequency and get transmitting frequency functions. The function call would be written such that, if RADIO A is being used the frequency is represented by bits 0-15 of the first word and 0, 4-6 of the second word of a message whereas it is represented by bits 0-15 of the second word for RADIO B (wherein an offset is represented by bits 10-15 of the first word) and word 1 or 2 for RADIO C depending on whether it is a transmitting or receiving frequency. Likewise, for the set satellite channel function, a function call would be written that, if RADIO B is used, sets bits 8-15 of the first word, and if RADIO C is used, bytes 1 and 2 of the third word are set.

As will be appreciated by one of ordinary skill in the art, the resulting interface may be informed of which radio the system is presently in communication with a number of ways. In certain embodiments, the system may provide a flag or other indicator of the specific radio. In certain embodiments, the system may be queried to determine which radio is in use. In certain embodiments, the radio itself may be queried. In yet other embodiments, which radio is in use is determined from messages being received from the radio.

As will be understood by one of ordinary skill in the art, for certain applications, various industry or application specific requirements may need to be considered in addition to the size, scaling, and or requirements of the parameters. This may include, but is not limited to, safety critical requirements for interface protocols or specific formatting required for certification under a given standard.

The parameters of each object specific function of each radio is then reviewed to ensure that the parameter has been mapped to a variable of an established function call and are tested with each object. The function calls have then transformed the multiple object specific interface protocols into an implementation independent interface protocol.

While the preferred embodiments of the present invention have been illustrated in detail, it should be apparent that modifications and adaptations to those embodiments may occur to one skilled in the art without departing from the scope of the present invention.

What is claimed is:

1. A method of communicating between a platform and a plurality of devices, wherein each of the plurality of devices comprises a set of parameters, the method comprising:
   for each parameter of each set of parameters, creating a single non-device specific function call to set said parameter for each of the plurality of devices enabling said parameter wherein each of the plurality of devices has a device specific interface protocol; and
   transforming, using each of the non-device specific function calls created, at least one device specific interface protocol and at least one other device specific interface protocol to create a single non-device specific interface protocol for communicating between the platform and the plurality of devices, wherein the at least one device specific interface protocol differs from the at least one other device specific interface protocol.

2. The method of claim 1, further comprising defining the plurality of devices to include devices comprising a common feature.

3. The method of claim 2, further comprising examining an interface control document (ICD) to identify a set of parameters.

4. The method of claim 3, further comprising generating a requirement document based upon each non-device specific function call.

5. The method of claim 3, wherein the plurality of devices comprise (N) devices, wherein (N) is greater than or equal to 1, wherein an (i)th device has an (i)th set of parameters, the method further comprising verifying, for each value of (i), that each parameter of the (i)th set of parameters can be engaged by at least one of the non-device specific function calls, wherein (i) is initially set to 1, and wherein (i) is less than or equal to (N).

6. The method of claim 5, further comprising testing, for each value of (i), each non-device specific function call with the (i)th device.

7. The method of claim 6, further comprising generating a requirement-specific test for the non-device specific interface protocol, wherein the requirement-specific test satisfies an industry test standard.

8. The method of claim 7, further comprising:
   performing the requirement-specific test using the non-device specific interface protocol; and
   certifying the non-device specific protocol under the industry test standard.

9. The method of claim 3, wherein the plurality of devices comprise (N) devices, wherein (N) is greater than or equal to 1, wherein an (i)th device is manufactured by an (i)th vendor, the method further comprising receiving, for each value of (i), an (i)th ICD from the (i)th vendor, wherein (i) is initially set to (1), and wherein (i) is less than or equal to (N).

10. The method of claim 9, further comprising determining, for each value of (i), an (i)th set of parameters for the (i)th device from the (i)th ICD.

11. An article of manufacture comprising a computer readable medium comprising computer readable program code disposed therein for communicating between a platform and a plurality of devices, wherein each of the plurality of devices comprises a set of parameters, the computer readable program code comprising a series of computer readable program steps to effect:
   for each parameter of each set of parameters, establishing creating a single non-device specific function call to set said parameter for each of the plurality of devices enabling said parameter, wherein each of the plurality of devices has a device specific interface protocol; and
   transforming, using each of the non-device specific function calls created, at least one device specific interface protocol and at least one other device specific interface protocol to create a single non-device specific interface protocol for communicating between the platform and the plurality of devices, wherein the at least one device specific interface protocol differs from the at least one other device specific interface protocol.

12. The article of manufacture of claim 11, wherein said computer readable program code further comprises a series of computer readable program steps to effect defining the plurality of devices to include devices comprising a common feature.

13. The article of manufacture of claim 12, wherein said computer readable program code further comprises a series of computer readable program steps to effect abstracting a set of parameters from an interface control document (ICD).

14. The article of manufacture of claim 13, wherein said computer readable program code further comprises a series of computer readable program steps to effect generating a requirement document based upon each non-device specific function call.

15. The article of manufacture of claim 13, wherein the plurality of devices comprise (N) devices, wherein (N) is greater than or equal to 1, wherein an (i)th device has an (i)th set of parameters, wherein said computer readable program code further comprises a series of computer readable program steps to effect verifying, for each value of (i), that each parameter of the (i)th set of parameters can be engaged by at least one of the non-device specific function calls, wherein (i) is initially set to 1, and wherein (i) is less than or equal to (N).

16. The article of manufacture of claim 15, wherein said computer readable program code further comprises a series of computer readable program steps to effect testing, for each value of (i), each non-device specific function call with the (i)th device.

17. The article of manufacture of claim 16, wherein said computer readable program code further comprises a series of computer readable program steps to effect generating a requirement-specific test for the non-device specific interface protocol, wherein the requirement-specific test satisfies an industry test standard.

18. The article of manufacture of claim 17, wherein said computer readable program code further comprises a series of computer readable program steps to effect:
- performing the requirement-specific test using the non-device specific interface protocol; and
- certifying the non-device specific protocol under the industry test standard.

19. The article of manufacture of claim 13, wherein the plurality of devices comprise (N) devices, wherein (N) is greater than or equal to 1, wherein an (i)th device is manufactured by an (i)th vendor, wherein said computer readable program code further comprises a series of computer readable program steps to effect receiving, for each value of (i), an (i)th ICD from the (i)th vendor, wherein (i) is initially set to (1), and wherein (i) is less than or equal to (N).

20. The article of manufacture of claim 19, wherein said computer readable program code further comprises a series of computer readable program steps to effect determining, for each value of (i), an (i)th set of parameters for the (i)th device from the (i)th ICD.

21. A computer program product encoded in a computer readable medium and usable with a programmable computer processor for communicating between a platform and a plurality of devices, wherein each of the plurality of devices comprises a set of parameters, the computer program product comprising:
- computer readable program code which causes said programmable processor to create, for each parameter of each set of parameters, a single non-device specific function call to set said parameter for each of the plurality of devices enabling said parameter, wherein each of the plurality of devices has a device specific interface protocol; and
- computer readable program code which causes said programmable processor to transform, using each of the non-device specific function calls created, at least one device specific interface protocol and at least one other device specific interface protocol to create a single non-device specific interface protocol for communicating between the platform and the plurality of devices, wherein the at least one device specific interface protocol differs from the at least one other device specific interface protocol.

22. The computer program product of claim 21, further comprising computer readable program code which causes said programmable processor to define the plurality of devices to include devices comprising a common feature.

23. The computer program product of claim 22, further comprising computer readable program code which causes said programmable processor to abstract a set of parameters from an interface control document (ICD).

24. The computer program product of claim 23, further comprising computer readable program code which causes said programmable processor to generate a requirement document based upon each non-device specific function call.

25. The computer program product of claim 23, wherein the plurality of devices comprise (N) devices, wherein (N) is greater than or equal to 1, wherein an (i)th device has an (i)th set of parameters, further comprising computer readable program code which causes said programmable processor to verify, for each value of (i), that each parameter of the (i)th set of parameters can be engaged by at least one non-device specific function call, wherein (i) is initially set to 1, and wherein (i) is less than or equal to (N).

26. The computer program product of claim 25, further comprising computer readable program code which causes said programmable processor to test, for each value of (i), each non-device specific function call with the (i)th device.

27. The computer program product of claim 26, further comprising computer readable program code which causes said programmable processor to generate a requirement-specific test for the non-device specific interface protocol, wherein the requirement-specific test satisfies an industry test standard.

28. The computer program product of claim 27, further comprising:
- computer readable program code which causes said programmable processor to perform the requirement-specific test using the non-device specific interface protocol and
- computer readable program code which causes said programmable processor to certify the non-device specific protocol under the industry test standard.

29. The computer program product of claim 23, wherein the plurality of devices comprise (N) devices, wherein (N) is greater than or equal to 1, wherein an (i)th device is manufactured by an (i)th vendor, the computer program product further comprising computer readable program code which causes said programmable processor to receive, for each value of (i), an (i)th ICD from the (i)th vendor, wherein (i) is initially set to (1), and wherein (i) is less than or equal to (N).

30. The computer program product of claim 29, further comprising computer readable program code which causes said programmable processor to determine, for each value of (i), an (i)th set of parameters for the (i)th device from the (i)th ICD.

* * * * *